United States Patent [19]
Bojarczuk, Jr. et al.

[11] Patent Number: 6,120,909
[45] Date of Patent: Sep. 19, 2000

[54] MONOLITHIC SILICON-BASED NITRIDE DISPLAY DEVICE

[75] Inventors: Nestor A. Bojarczuk, Jr., Poughkeepsie; Supratik Guha, Yorktown Heights; Richard Alan Haight, Mahopac, all of N.Y.

[73] Assignee: International Business Machines Corporation, Armonk, N.Y.

[21] Appl. No.: 09/136,273

[22] Filed: Aug. 19, 1998

[51] Int. Cl.$^7$ ........................................................ B32B 9/00

[52] U.S. Cl. .......................... 428/446; 428/469; 428/472; 428/698; 313/504; 313/506; 257/102; 257/103; 345/82; 345/83; 362/227; 340/907

[58] Field of Search ..................................... 428/698, 469, 428/472, 446; 313/498, 504, 506; 257/100, 102, 103; 345/82, 83; 362/227; 340/907

[56] References Cited

U.S. PATENT DOCUMENTS 5,583,351  12/1996  Brown .

*Primary Examiner*—Timothy M. Speer

[57] ABSTRACT

A color display device which may be used as a gallium nitride (LED) light emitting diode based traffic light is disclosed. Unlike previous large GaN based display devices, which have been built up from numerous small display elements formed on sapphire substrates, the disclosed device preferably uses an entire monolithic silicon wafer as both a substrate and for connection as a whole as a conducting first electrode, a light emitting layered structure of GaN-based materials over the entire monolithic silicon substrate, and a substantially transparent metallic second electrode layer over the layered structure. In order to emit desired traffic light colors (e.g. yellow, red), a color conversion layer is disposed over the transparent metallic electrode layer.

9 Claims, 4 Drawing Sheets

MONOLITHIC SILICON-BASED NITRIDE DISPLAY DEVICE

BACKGROUND OF THE INVENTION

The present invention relates to color display devices, such as traffic lights, which utilize semiconductor light emitting diode (LED) based display elements. Such display devices are commercially attractive as a consequence of the high power efficiency, low operating voltage, and extended lifetimes of such LED display elements.

BACKGROUND OF THE INVENTION

GaN based LEDs are presently considered serious contenders for the traffic light market. However, such devices have several disadvantages based upon considerations of economy. Present commercial devices for large area displays such as traffic lights are grown on expensive sapphire or silicon carbide substrates. Since the sizes of such SiC and sapphire substrates (that are appropriate for nitride growth) are small and limited to 2–4 inches, the large area displays or traffic lights are pieced together from individual discrete device components. This process is sometimes called "tiling" or, for very small tile elements such as pixels, the process may hereinafter be called "pixelating". Additionally, the most popular substrate used today, sapphire, is not only expensive but is insulating and requires two front side contacts and additional processing steps. GaN LEDs on sapphire or SiC are a well established technology as described in S. N. Mohammed et al, Proceed IEEE V83, 1306 (1995). GaN based LEDs on sapphire substrates that are pieced together in a "discrete components" approach are used for large area signs such as traffic lights by companies such as Nichia Chemical Industries of Japan. Because of these complexities, the manufacturing cost is high.

GaN based LEDs themselves can be used only for green lights by using an InGaN active light emitting layer. Red and yellow lights must be based on GaInAsP based compounds if only semiconductor LEDs are used. Such GaInAsP based light emitters have the further disadvantage that they are limited in size to 6 inches at the most and are also expensive. On the other hand, with the use of a color converter that can be either organic or inorganic placed on top of a GaN based LED that operates in the blue or ultraviolet, one may have three color traffic lights operating in the red, green, or yellow. Such color conversion is described with reference to a hybrid light emitting diode structure in U.S. patent application Ser. No. 08/81990, (IBM docket YO9-98-242), filed Mar. 5, 1997, by Bojarczuk et al, as well as in S. Guha et al, J. Appl. Phys., V82, p. 4126 (1997).

The present invention has the objective of providing a large area light emitting display device that is deposited monolithically on a large silicon substrate, and that operates in an unpixelated fashion and which makes use of the above concepts as particular aspects of its operation, is new and has major cost and simplicity based advantages for applications such as traffic lights.

SUMMARY OF THE INVENTION

The present invention provides a color display device structure comprising a GaN based LED layered structure grown monolithically on large silicon substrates, such as entire silicon wafers. Optionally, organic or inorganic color converson materials may be added for traffic lights or other large area light emitters operating in the red, green, yellow, or any other visible color. A large area light emitting device, such as a traffic light for example, can be made cheaply using a monolithic large silicon substrate/GaN LED/color converting layer large area device structure that avoids the disadvantages described can be used as a large area lamp such as a traffic light. For silicon, 8 inch diameter substrates are presently available and 12 inch substrates are a near future possibility. A single, cheap,, preferably substantially complete, silicon wafer can thus be used to make a single traffic light in a monolithic fashion, without resorting to piecing together discrete components based on expensive substrates as is done today. Moreover, unlike a sapphire substrate, a silicon substrate is electrically conducting and can itself be used, as a whole, as one of the electrical contacts, thereby considerably simplifying the interconnect scheme and lowering manufacturing costs.

The present invention therefore broadly provides a color display device comprising at least one monolithic LED (light emitting diode) display element comprising:

a) a monolithic silicon substrate (preferably comprising a substantially complete silicon wafer) having a major surface, said silicon substrate being adapted for connection as a whole to an electrical source to serve as a first electrode of said monolithic LED display element, b) a light (i.e. electromagnetic radiation, such as visible light) emitting layered structure formed from a plurality of layers, each layer comprising a compound of nitrogen with at least one member selected from the group consisting of Ga, In, and Al, said layered structure being disposed over substantially the entirety of said major surface of said silicon substrate, and c) at least one metal electrode disposed on said layered structure, said metal electrode being adapted to permit passage of light emitted from said light emitting layered structure.

Preferably, the metal electrode may be formed as a sufficiently thin film to permit electromagnetic radiation (e.g. visible light) to pass therethrough from the light emitting layered structure. Alternatively, the metal electrode may be formed as a lattice to provide a plurality of substantially uniformly distributed apertures to permit the passage of light emitted from the light emitting layered structure.

Preferably, each monolithic LED display element comprises a color conversion layer disposed over the metal electrode, said color conversion layer comprising a substance capable of changing light (i.e. electromagnetic radiation, such as visible light) emitted by the layered structure to radiation of a longer wavelength or color.

In a preferred embodiment for use as a traffic light, wherein each monolithic LED display element comprises three of said metal electrodes disposed in mutually intermeshed/interdigitated formation over said light emitting layered structure, said monolithic LED display element further comprising i) a first color conversion layer disposed over only one of said three metal electrodes, and ii) a second color conversion layer disposed over only one other of said three metal electrodes, said color conversion layers comprising substances capable of changing light (i.e. electromagnetic radiation) emitted by the layered structure to radiation of longer wavelengths or colors.

Desirably the layered structure comprises an InGaN active layer and emits a green color, while the first and second color conversion layers serve to change the green color to yellow and red, respectively.

In an alternative embodiment of the invention for use as a traffic light, the color display device comprises three of the monolithic LED display elements for displaying the colors green, yellow, and red, respectively, a yellow color conversion layer being disposed over the metal electrode of one of the three monolithic LED display elements, and a red color conversion layer over the metal electrode of another one of the three monolithic LED display elements.

DESCRIPTION OF PREFERRED EMBODIMENTS OF THE INVENTION

Figure 1:
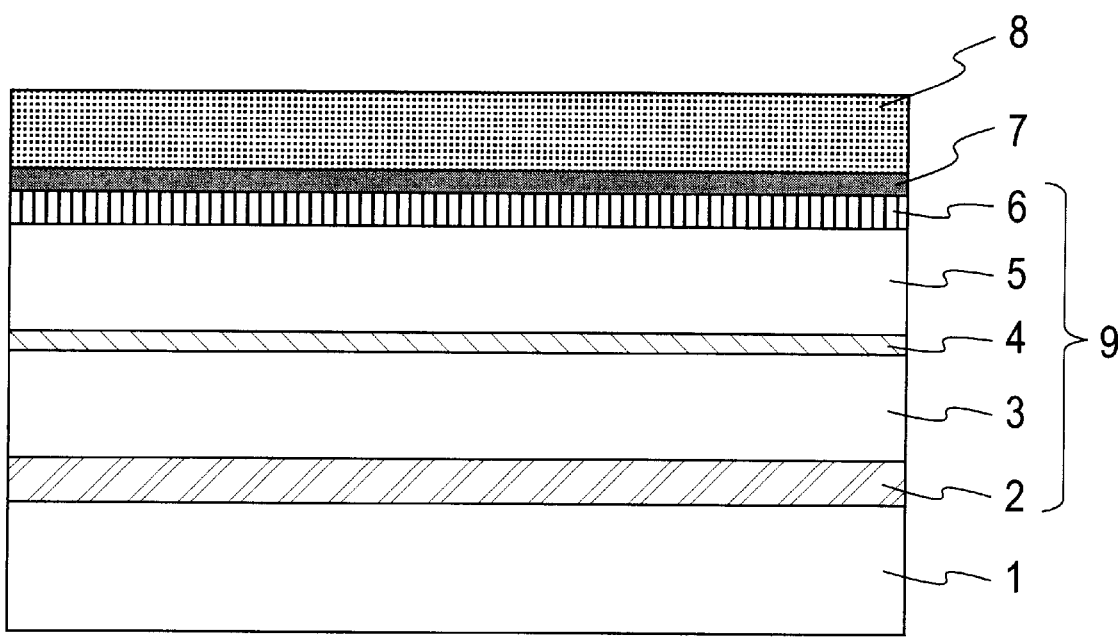
FIG. 1 is a cross sectional view of a general monolithic LED display element of a color display device according to the present invention.

The typical cross-sectional schematic of a silicon substrate based monolithic large area light emitter is shown in FIG. 1. For brevity and clarity of description in this specification, the III in "III-N" shall be understood to refer to the column three elements (in the periodic table), namely Ga, In, and Al. The device structure is constructed upon a large silicon wafer 1 and consists of a III-N semiconductor buffer (nucleation) layer 2 followed by an n-type (n-doped) III-N semiconductor layer 3, an active III-N light emission layer 4, a p-type (p-doped) III-N semiconductor layer 5, another p-type (p-doped) III-N semiconductor layer 6, and a thin transparent metal electrical contact electrode 7. In general, layers 2–6 are semiconducting nitrides of the form $Al_xGa_yIn_{1-x-y}N$, where (x+y), x, and y each have values between 0 and 1. As will be understood, metal electrode 7 must permit passage of electromagnetic radiation, such as ultraviolet, infrared, or visible light (here simply called "light") emitted from the light emitting layered structure 9 composed of III-N layers 2, 3, 4, 5, and 6. For the purpose of such transparency, metal electrode 7 may be made thin enough to permit passage of light. Alternatively, metal electrode 7 may be formed as a lattice to provide a plurality of substantially uniformly distributed apertures for passage of light emitted from layered structure 9. Moreover, if desired, the p-type layers 3 and n-type III-N layers 5,6 within layered structure 9 may be reversed in order.

Figure 2:
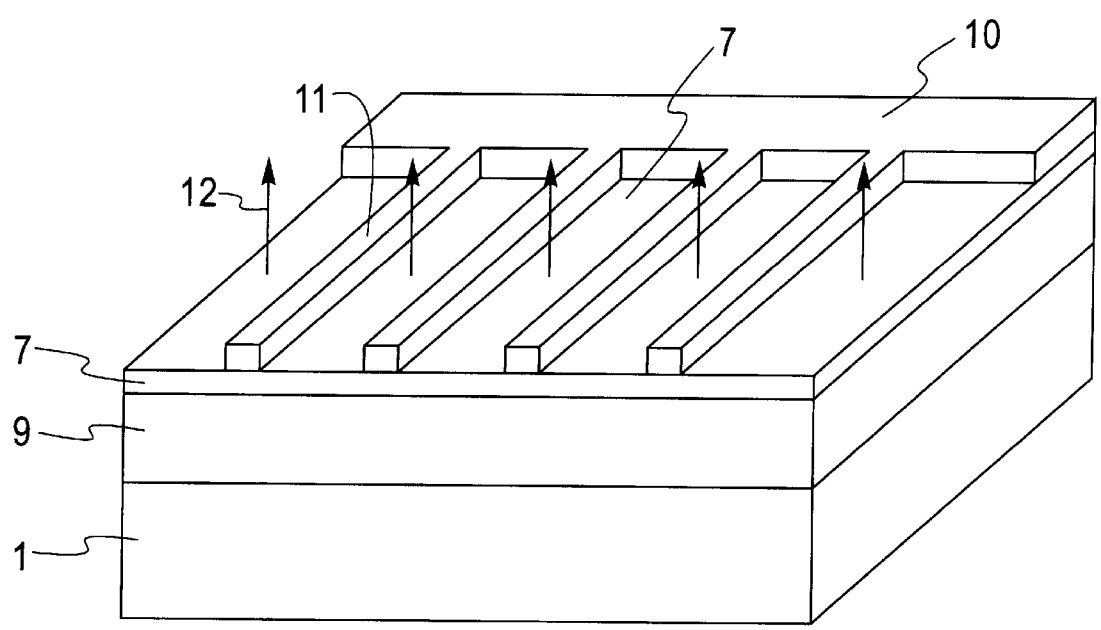
FIG. 2 is a perspective view of a novel monolithic LED display element to show one metal electrode configuration.
Figure 3:
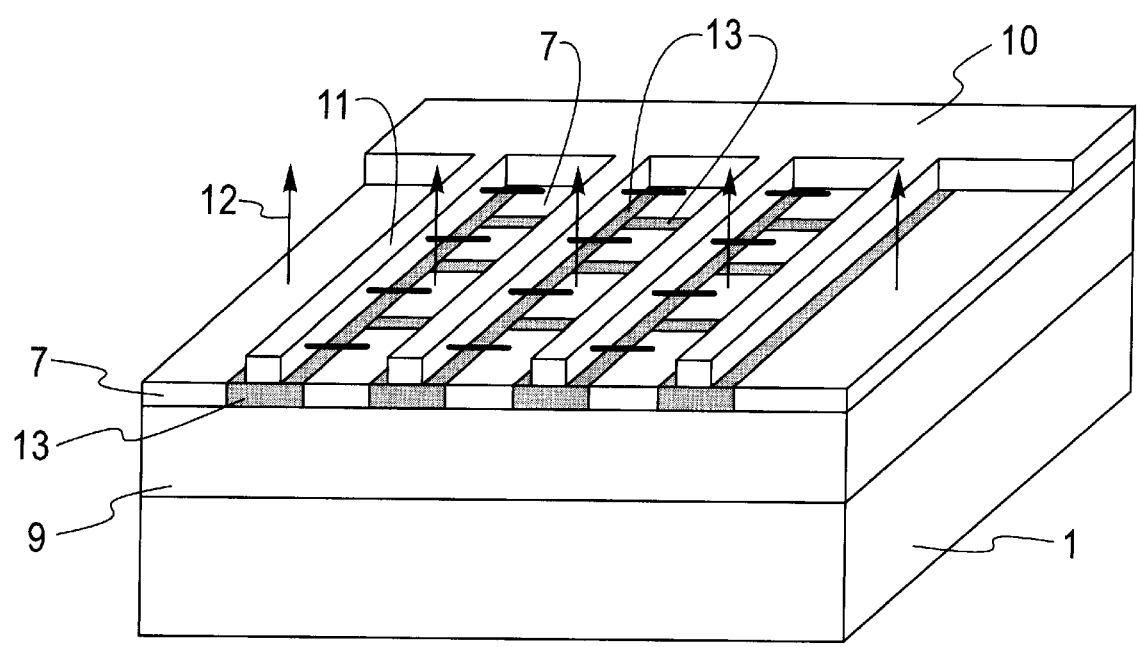
FIG. 3 is a perspective view of a novel monolithic LED display element to show another metal electrode configuration.

On top of the metal electrode layer 7, as will be described in greater detail hereinafter, there may preferably be provided a color conversion fluorescent layer 8 for color conversion of the electroluminescence emitted from the layered structure 9 of the GaN device. For electrical contacts the monolithic conductive Si substrate 1, as a whole, serves as a bottom contact. The top electrical contact may be of a ribbed form as shown in FIG. 2 where thicker current distribution bus bar 10 and contact fingers 11 feed adjacent thin, light transparent metal contact layers 7 which permit light 12 to pass therethrough. Alternately, the thin light transparent layers 7 may be isolated in the form of square contacts that are connected in parallel using thicker contact fingers 11 and dielectric isolation layers 13 as in FIG. 3. This isolation would help to eliminate the effects of localized, leaky, short circuit paths in the structure.

An entire color display device consists of the silicon substrate 1 in conjunction with the gallium nitride layered structure 9, the color conversion layer 8, electrode 7, and the associated wiring connectors. A single such large monolithic device can be used for a large area light emitter application, such as a traffic light.

The color converters of color conversion layer 8, if used, may be organic fluorescent compounds or combinations of these, or inorganic phosphors. Organic color converters may be in the form of one or more combinations of laser dyes such as the Coumarins, DCM (4-dicyanomethylene-2-methyl-6- (p-dimethylaminostyryl)-4H-pyran), the Rhodamines, etc. dispersed in a polymeric matrix. Inorganic converters may be standard phosphors such as the rare earth doped oxides, aluminates and borates, and doped wide gap II-VI compounds such as ZnS. These color converters are tuned to absorb the III-N electroluminescence, and re-emit light at a longer wavelength.

Figure 4:
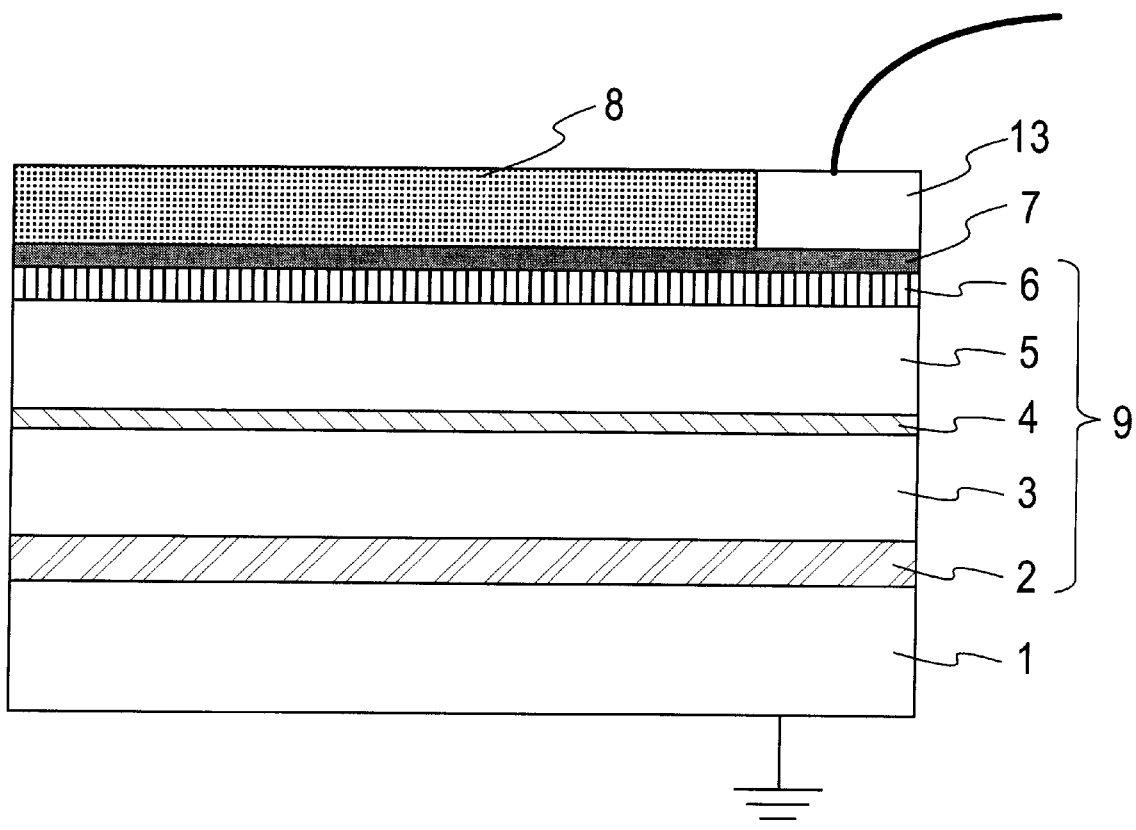
FIG. 4 is a cross sectional view of a specific novel display element structure.

A more specific example of a novel layered display device is shown in FIG. 4. In this case, upon a major surface of a Si wafer which forms substrate 1, the device structure consists of an AlN nucleation layer 2 (e.g. 8 nm), a 1.5 micron thick AlGaN n-doped (with Si) layer 3, a 10 nm thick InGaN active layer 4, a 0.5 micron thick p-doped (with Mg) AlGaN layer 5, a GaN p-doped contact layer 6, a 3 nm Ni plus 15 nm thick Au metal transparent electrode layer 7 and a wiring connection 13. Upon this transparent metal layer, color conversion layers 8 may next be deposited to change the emitted light to a different visible wavelength. The III-N device layers may be grown either by molecular beam epitaxy (MBE) or metal-organic chemical vapor deposition (MOCVD), and hydride vapor phase epitaxy (HVPE), which are both well established techniques.

The invention thus comprises a large area monolithic light emitting device structure that is based upon a large area single crystal silicon wafer, along with III-N compound semiconducting layers and fluorescent color converting layers. The device is operated by using an Si substrate, preferably the complete 8" or 12" Si wafer, as a whole, as a bottom electrode and the top metal layer as a top electrode. When electric current is passed between the two electrodes, the InGaN layer electroluminesces in the ultraviolet to green, the specific wavelength of the emission depending upon the relative fractions of In and Ga. If there are color conversion layers present, they absorb the InGaN electroluminescence and remit at a wavelength larger than the electroluminescence wavelength. For example, if the color converting layer is a combination of the dyes Coumarin 6 and DCM, and the active layer is GaN (0% In), then the electroluminescence occurs at 360–380 nm and the dye combination fluoresces around 600 nm in the orange). If, on the other hand, instead of DCM, Phenoxazone 660 were used as the dye, the fluorescence would occur around 620 nm, in the red. Alternatively, if one were to use an inorganic phosphor such as Ce doped YAG (yttrium aluminum garnet), then the fluorescence would occur in the green. The entire device can thus be used as a traffic light emitting in a color of one's choice.

The GaN based diode electroluminesces in the UV to green. For an application such as a traffic light, however, yellow, green, and red are required. Green may be obtained by simply using a InGaN active layer, without a color converter, as shown in an article by S. N. Mohammed et al in Proceed. IEEE V83, 1306 (1995). Moreover, Nichia provides LEDs that are grown on sapphire for use in traffic lights. In our case, a green traffic light may be obtained by using a similar InGaN active region on a large Si substrate. For red, or yellow operation, we can use a UV (360–400 nm) III-N device structure (with an InGaN active layer such that the In composition is appropriate for such emission) on Si along with organic or inorganic color converters. The organic converters could be combinations of laser dyes such as the Coumarins, the Rhodamines, Phenoxazone, or other efficient converters. These luminescent organics could be embedded in a polymer matrix such as PMMA (poly methyl methacrylate).

In such an arrangement, appropriate concentrations of organic dye is dissolved along with PMMA or other such host material in a suitable organic solvent and spun onto the diode structure. UV light emitted from the underlying diode material is absorbed in the color conversion layer. The light absorption process results in electrons excited to high lying molecular states of the organic dye. Radiative relaxation of these excited electrons to lower lying states results in emission of light at longer wavelengths than the excitation light. If the absorption of the excitation light is complete and non-radiative de-excitation paths can be minimized, extremely high conversion rates, approaching 90% can be achieved. As a result, longer wavelength light is created resulting in the color change desired. This approach is fundamentally different from color filtering in which a white light source is required and desired colors are produced by subtracting out unwanted frequencies, resulting in, at best, a 33% efficiency in the production of a particular color of light emission.

Alternately, the color converters could be inorganic phosphors which are typically produced by incorporating appropriate (usually rare earth) elements into a ZnS host, or an oxide or aluminate sublattice. These materials are deposited onto the GaN light emitter or dispersed, again, in a polymeric media. The inorganic phosphors have traditionally been tuned for absorption around 240 nm (for use with fluorescent lamps for instance). However, recent work has focused on excitation of these phosphors at 360–400 nm range for operation with GaN LEDs. Nichia, for instance, has a white light emitter using a UV GaN LED on sapphire with such inorganic phosphors. Inorganic phosphors have high (50–80%) fluorescence efficiencies. Organic dyes also have high internal fluorescence efficiencies and individual dye molecules may have efficiencies of >95%. However, since such dyes are dispersed in a smooth matrix, total internal reflection limits the external fluorescence efficiency. For the phosphors, since the deposited material is usually quite granular, problems with total internal reflection are minimized.

While traffic lights using nitride LEDs are a known application, these are grown on smaller sapphire substrates and these LEDs are then pieced together to produce the traffic light. On the other hand, using the advantage of a large Si substrate, we propose a single, large, monolithically grown device to replace a traffic light, making it much cheaper and more convenient. The nitride LED based traffic lights grown on sapphire also require complicated processing for making two front side contacts (since sapphire is semi-insulating). In our case, the silicon substrate itself is conducting and thus may be used as a whole as one electrode: thus processing complications are much reduced. Red traffic lights can be made using GaAsInP-based light emitting devices. However, these require expensive (and smaller) GaAs substrates as well, since such devices grown on Si exhibit poor, unacceptable performance. Thus in order to benefit from the size and price advantages of Si substrates, it is important to use the III-N based compounds.

One approach for using our novel displays as traffic lights is to use three separate display devices for the colors green, yellow, and red, respectively, by selecting materials and color converter layers as discussed hereinabove. Thus, the green, yellow, and red color display devices may be attached to a common frame and a controlled signal source for supplying voltage signals to each of the three display devices to cause them to emit green, yellow, and red signal lighting, as desired.

Alternatively, the three colors of light may be produced from a single color display device by forming three intermeshed (but mutually electrically isolated) light-permeable electrodes over a light emitting structure that is disposed over a single monolithic silicon substrate. To produce the three colors with this unified structure, green, yellow, and red color conversion layers may be applied over the corresponding ones of the three electrodes in patterns that match the shapes of the respective electrodes. Alternatively, while yellow and red color conversion layers may be disposed respectively over two of the intermeshed electrodes, the third electrode may require no green color conversion layer if the light emitting structure already possesses a green emission characteristic. As for the 3-wafer structure discussed above, this single-wafer structure would be controlled by selective application of voltages to the 3 intermeshed electrodes.

By contrast with previously mentioned prior art display devices, according to the present invention:

(1) Our devices are monolithic, large and leverage the use of large single crystal wafers of silicon of dimensions 6 inch or larger in diameter.

(2) In earlier displays, an overall image is formed as a consequence of different pixels in the display lighting up in different color, or remaining turned off. In this sense such a display may be thought of as being composed of individual light emitting devices that are individually addressable. In our device, as in a traffic light, the entire device as a whole lights up at the same time to form an image (e.g. "red"): there is thus no image to form and the wiring thus does not require complex pixel addressing capability.

While the present invention has been described with reference to a preferred embodiment in order to facilitate a better understanding of the invention, those skilled in the art will recognize that the invention can be embodied in various ways without departing from the scope and spirit of the invention as set forth in the appended claims.

What is claimed is:

1. A color display device comprising at least one monolithic LED (light emitting diode) display element comprising:

a) a monolithic silicon substrate having a major surface, said silicon substrate being adapted for connection as a whole to an electrical source to serve as a first electrode of said monolithic LED display element, b) a light emitting layered structure formed from a plurality of layers, each layer comprising a compound of nitrogen with at least one member selected from the group consisting of Ga, In, and Al, said layered structure being disposed over substantially the entirety of said major surface of said silicon substrate, and c) at least one metal electrode disposed on said layered structure, said metal electrode being adapted to permit passage of light emitted from said light emitting layered structure.

2. A color display device as set forth in claim 1, wherein said monolithic silicon substrate comprises a substantially complete silicon wafer.

3. A color display device as set forth in claim 1, wherein each monolithic LED display element comprises a color conversion layer disposed over said metal electrode, said color conversion layer comprising a substance capable of changing electromagnetic radiation emitted by said layered structure to radiation of longer visible wavelength.

4. A color display device as set forth in claim 1 for use as a traffic light, wherein each monolithic LED display element comprises three of said metal electrodes disposed in mutually intermeshed and electrically isolated formation over said light emitting layered structure, said monolithic LED display element further comprising i) a first color conversion layer disposed over only one of said three metal electrodes, and ii) a second color conversion layer disposed over only one other of said three metal electrodes, said color conversion layers comprising substances capable of changing electromagnetic radiation emitted by said layered structure to radiation of longer visible wavelengths.

5. A color display device as set forth in claim 4, wherein said layered structure comprises an InGaN active layer and emits a green color, and wherein said first and second color conversion layers change said green color to yellow and red, respectively.

6. A color display device as set forth in claim 1 for use as a traffic light, said color display device comprising three of said monolithic LED display elements for displaying the colors green, yellow, and red, respectively, a yellow color conversion layer being disposed over the metal electrode of one of the three monolithic LED display elements, and a red color conversion layer being disposed over the metal electrode of another one of the three monolithic LED display elements.

7. A color display device as set forth in claim 1, said metal electrode being formed as a sufficiently thin film to permit light to pass therethrough from said light emitting layered structure.

8. A color display device as set forth in claim 1, said metal electrode being formed as a lattice to provide a plurality of substantially uniformly distributed apertures to permit passage of light emitted from said light emitting layered structure.

9. A color display device as set forth in claim 1, wherein each said layer comprises a semiconducting nitride of the form $Al_xGa_yIn_{1-x-y}N$, where (x+y), x, and y each have values between 0 and 1.

* * * * *